(12) United States Patent
Sinibaldi

(10) Patent No.: US 11,063,846 B2
(45) Date of Patent: Jul. 13, 2021

(54) SYSTEM AND METHOD FOR REMOTE WAVEFORM ANALYSIS WITH ASSOCIATED METADATA

(71) Applicant: SR Technologies, Inc., Sunrise, FL (US)

(72) Inventor: John C. Sinibaldi, Pompano Beach, FL (US)

(73) Assignee: SR Technologies, Inc., Sunrise, FL (US)

( * ) Notice: Subject to any disclaimer, the term of this patent is extended or adjusted under 35 U.S.C. 154(b) by 4 days.

(21) Appl. No.: 16/833,910

(22) Filed: Mar. 30, 2020

(65) Prior Publication Data

US 2020/0228425 A1 Jul. 16, 2020

Related U.S. Application Data

(63) Continuation of application No. 15/094,309, filed on Apr. 8, 2016, now abandoned.

(60) Provisional application No. 62/147,288, filed on Apr. 14, 2015.

(51) Int. Cl.

| | |
|---|---|
| *G06F 15/173* | (2006.01) |
| *H04L 12/26* | (2006.01) |
| *H04L 29/08* | (2006.01) |
| *H04W 12/08* | (2021.01) |
| *H04W 12/02* | (2009.01) |
| *H04W 12/03* | (2021.01) |

(52) U.S. Cl.
CPC .......... *H04L 43/04* (2013.01); *H04L 67/2804* (2013.01); *H04W 12/02* (2013.01); *H04W 12/03* (2021.01); *H04W 12/08* (2013.01); *H04L 43/0817* (2013.01); *H04L 43/0823* (2013.01); *H04L 43/0888* (2013.01)

(58) Field of Classification Search
CPC . H04L 43/04; H04L 67/2804; H04L 43/0823; H04L 43/0888; H04L 43/0817; H04W 12/03; H04W 12/02; H04W 12/08
USPC ......................................................... 709/224
See application file for complete search history.

(56) References Cited

U.S. PATENT DOCUMENTS

| | | | |
|---|---|---|---|
| 9,438,491 B1* | 9/2016 | Kwok | ................ G06Q 30/0201 |
| 2005/0285953 A1* | 12/2005 | Hasegawa | .............. H04N 7/181 |
| | | | 348/239 |
| 2007/0157224 A1* | 7/2007 | Pouliot | .................. H04H 20/14 |
| | | | 725/22 |
| 2009/0161017 A1* | 6/2009 | Glen | ...................... H04N 19/61 |
| | | | 348/624 |

(Continued)

*Primary Examiner* — Anh Nguyen
(74) *Attorney, Agent, or Firm* — Christopher & Weisberg, P.A.

(57) ABSTRACT

A method and waveform handling apparatus for capturing and storing data waveforms and metadata for analysis. The method includes receiving waveform data and metadata, the waveform data corresponding to a demodulated data burst, creating a waveform data record from the received waveform data, associating the waveform data with corresponding metadata, and creating a metadata record from the corresponding metadata. The method allows the waveform data in the waveform data record to be stored in a first data repository and the corresponding metadata in the metadata record to be stored in a second data repository, the waveform data and the corresponding metadata accessible for analysis.

16 Claims, 10 Drawing Sheets

(56) References Cited

U.S. PATENT DOCUMENTS

| | | | |
|---|---|---|---|
| 2011/0252243 A1* | 10/2011 | Brouwer | G06F 21/62 |
| | | | 713/189 |
| 2013/0291000 A1* | 10/2013 | Wright | H04N 21/41407 |
| | | | 725/19 |
| 2013/0297638 A1 | 11/2013 | Hein et al. | |
| 2014/0159961 A1 | 6/2014 | Ware et al. | |
| 2014/0274031 A1 | 9/2014 | Menendez | |
| 2015/0071440 A1 | 3/2015 | Raghupathy et al. | |
| 2016/0065610 A1 | 3/2016 | Peteroy et al. | |
| 2016/0189174 A1 | 6/2016 | Heath | |

\* cited by examiner

SYSTEM AND METHOD FOR REMOTE WAVEFORM ANALYSIS WITH ASSOCIATED METADATA

CROSS-REFERENCE TO RELATED APPLICATION

This application is related to and claims priority to U.S. patent application Ser. No. 15/094,309, filed Apr. 8, 2016, entitled "SYSTEM AND METHOD FOR REMOTE WAVEFORM ANALYSIS WITH ASSOCIATED METADATA," which claims priority to U.S. Provisional Patent Application No. 62/147,288, filed Apr. 14, 2015, entitled "SYSTEM AND METHOD FOR REMOTE WAVEFORM ANALYSIS WITH ASSOCIATED METADATA", the entireties of both of which are incorporated herein by reference.

STATEMENT REGARDING FEDERALLY SPONSORED RESEARCH OR DEVELOPMENT n/a

TECHNICAL FIELD

The present disclosure relates to a method and system for wireless communications and in particular to the reception, demodulation, and analysis of digital wireless transmissions, including waveforms and associated metadata.

BACKGROUND

In a wireless communications system, it is desirable to monitor wireless communication traffic signals so as to investigate and determine the quality of the communications service. FIG. 1 is a schematic diagram of a typical digital wireless receiver 100. The signal is received at the antenna 101 and amplified by a low noise amplifier (LNA) 102. The signal is then converted to a base frequency by a mixer 103 which is fed by a carrier signal 104. The output of the mixer 103 is then converted to digital form by the analog to digital converter (ADC) 105 which converts the analog signal into N bit signed samples. The sample rate of the I and Q output samples 106 are then down converted in a digital down converter (DDC) 107. The I and Q outputs 108 from the DDC 107 are then input into a frame synchronization block 109. In the example of a time division multiple access (TDMA) frame format, the frame synchronization block 109 performs alignment of the frame boundary and selects the appropriate channel in the frame. The outputs from the frame synchronization block 109 are data samples 110 and frame number 111. The data samples 110 and the frame number 111 are input to the demodulator and decoder block 112 which converts the data samples 110 into decoded and demodulated data bits 114 together with the associated frame number 113. The decoded and demodulated data bits 114 may be in an encrypted format and if so, the de-encryption is carried out by decryption block 115. The resulting decrypted data 116 is then input to the upper layer blocks of upper layer protocol (i.e., Layer 2, Layer 3) block 117. The upper layer block protocol 117 may provide input 118 to the decryption block 115 so as to enable the encryption. It should be noted that blocks 112 and 115 may be contained within a digital signal processor (DSP) 119.

In particular, systems capture and store the actual waveform data that is received by the wireless device along with relevant metadata associated with the captured waveform. In this manner, the stored waveform data and metadata can be monitored in real time or replayed back at a later time. In the case where the stored waveform data is in an encrypted format, the stored waveform data can be stored in its encrypted form and decrypted only on playback, thus maintaining privacy until the time that the playback is initiated. Note that the waveform data may consist of the sampled waveform as processed by a software radio or could be the soft-bits of a demodulated waveform. In the former case, the waveform data is referred to as a collection of samples, in the latter case the waveform data is referred to as a collection of symbols or soft-bits. These soft-bits are the input to the error correction algorithm for the demodulator and hence reflect the quality of the signal but, because there is only one sample per symbol, with much less data.

Signal quality conditions that may want to be observed with the captured waveform are, for example, adjacent channel interference, alignment problems with the burst, hardware failures, or other signal impairments that may be correlated with the meta-data such as terminal Global Positioning System (GPS) location or time-of-day. In addition, the state of the radio itself may want to be observed. These include exception conditions, processor loading or system temperature for example. Further, any encryption status or related information may be observed.

Often, it is desirable to provide security measures in order to prevent unauthorized access to the waveform data or associated metadata. However, although it may be desirable to allow access to and analysis of the stored waveform data with no or limited security measures, it may be desirable to restrict access to the metadata, which in some circumstances may contain highly sensitive information. Difficulties may arise when both the waveform data and the associated metadata are provided the same access rights or are stored in the same storage entity.

SUMMARY

The present disclosure advantageously provides a method and waveform handling apparatus for capturing and securely storing data waveforms and associated metadata, such that the waveforms and associated metadata can be independently protected for access and analysis.

In one aspect of the disclosure, a method for associating waveform data with corresponding metadata is provided. The method includes receiving waveform data and metadata. The waveform data corresponds to a demodulated data burst and the metadata corresponds to the waveform data. A waveform data record is created from the received waveform data. The waveform data is associated with corresponding metadata and a metadata record is created from the corresponding metadata. The waveform data in the waveform data record is caused to be stored in a first data repository and the corresponding metadata in the metadata record is caused to be stored in a second data repository. The waveform data and the corresponding metadata accessible for analysis.

In another aspect of the disclosure, a waveform handling apparatus is provided. The waveform handler includes an interface and processing circuitry. The interface is configured to receive waveform data and metadata. The waveform data corresponds to a demodulated data burst and the metadata corresponds to the waveform data. The processing circuitry includes a processor, and a memory for storing instructions that, when executed, configure the processor to create a waveform data record from the received waveform data, associate the waveform data with corresponding metadata, create a metadata record from the corresponding metadata, and cause the waveform data in the waveform data record to be stored in a first data repository and the corresponding metadata in the metadata record to be stored in a second data repository. The waveform data and the corresponding metadata are accessible for analysis.

In accordance with still another aspect, the disclosure provides a waveform handling apparatus, the waveform handling apparatus having an interface and processing circuitry. The interface is configured to receive waveform data and metadata in which the waveform data corresponds to a demodulated data burst and the metadata corresponding to the waveform data. The processor circuitry includes a processor and a memory storing instructions that, when executed, configure the processor to, create a waveform data record from the received waveform data, associate the waveform data with corresponding metadata, create a metadata record from the corresponding metadata and cause the waveform data in the waveform data record to be stored in a first data repository and the corresponding metadata in the metadata record to be stored in a second data repository. The waveform data and the corresponding metadata are independently accessible for analysis based on separate access rights for the waveform data and the metadata.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

In order to aid understanding the disclosure, examples of use with a Time Division Multiple Access (TDMA) digital wireless radio are described. The specific details of the blocks of the digital radio are provided solely for example purposes and it is contemplated that uses in many other digital communications systems can be made based on the disclosures made herein. The present disclosure provides a way to create metadata records that correspond to signal records and provides a way to securely store the signal's metadata. A collection of such signals and metadata could be used to diagnose problems and improve system performance.

The present disclosure, as illustrated in FIGS. 2-9 and described below, provides a method and waveform handling apparatus that is configured to receive waveform data and associated metadata, store each in a separate database repository and, in some embodiments, provide one level of security access to the stored waveform data and a separate, independent level of security access to the stored metadata. In some embodiments, the level of security access for the stored waveform data is the same as the level of security access for the stored metadata. In some embodiments, the level of security access for the stored waveform data is different from the level of security access for the stored metadata. By storing the waveform data independently from its associated metadata, the waveform data can be analyzed and played back without having to access the associated metadata which, in some circumstances, may contain sensitive information. This allows, for example, an analyzing entity to analyze the waveform data while preventing the analyzing entity from having access to sensitive metadata.

Figure 1:
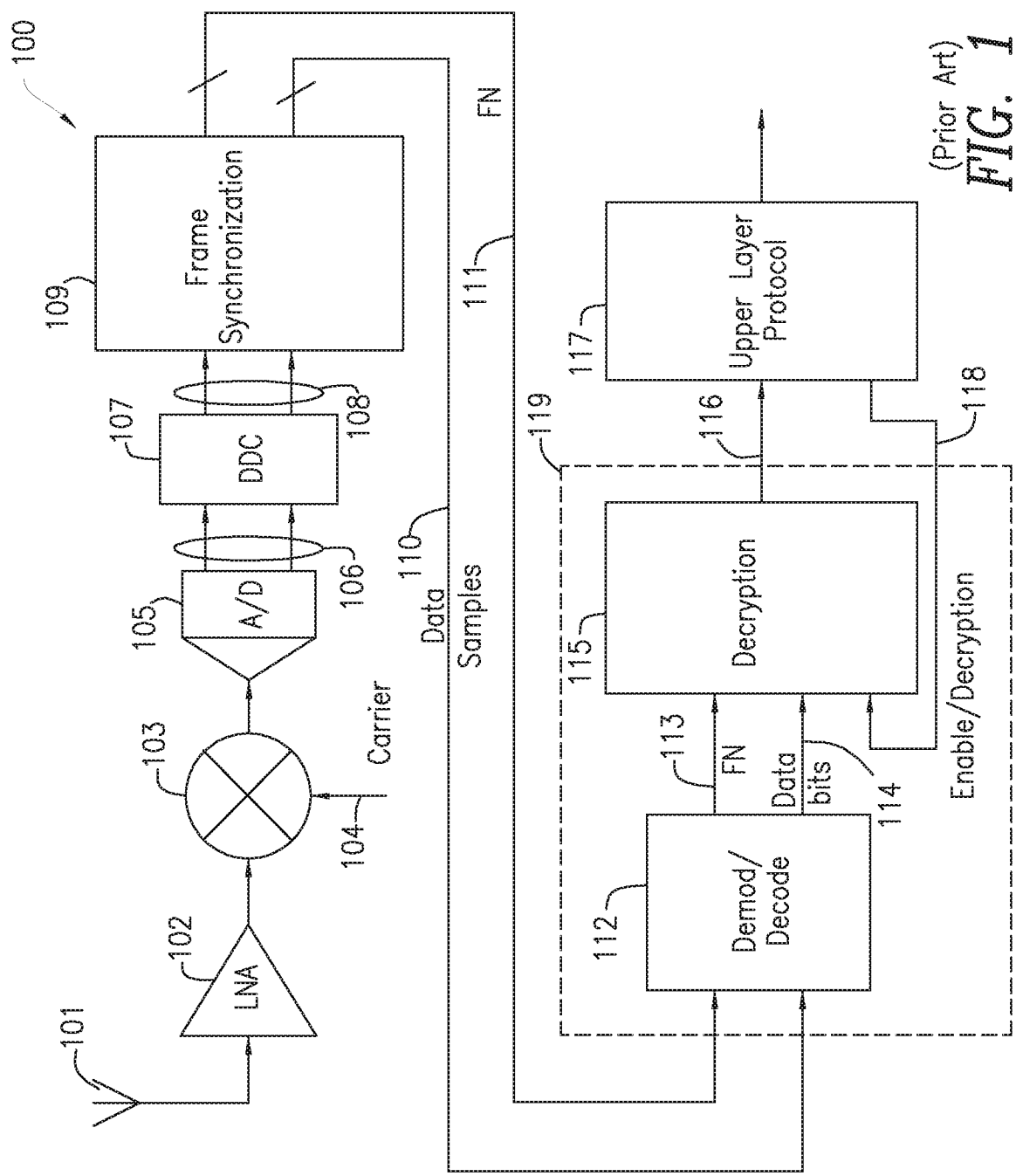
FIG. 1 is a block diagram of a typical digital wireless receiver.
Figure 2:
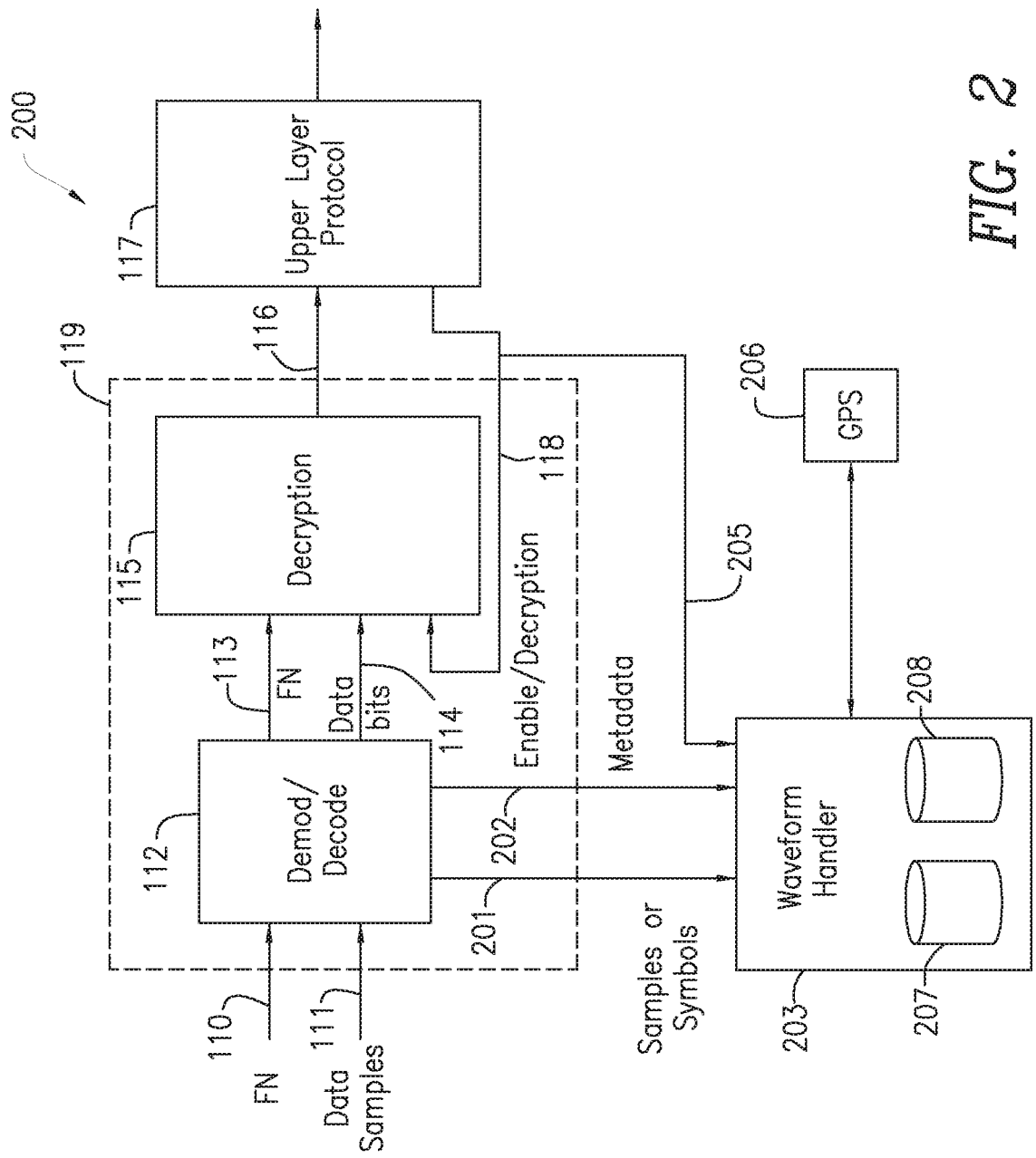
FIG. 2 is a block diagram including the addition of a waveform handler module attached to the demodulation and decode block of a digital receiver utilizing the principles of the present disclosure.

FIG. 2 is a block diagram of an embodiment of this disclosure that shows a digital wireless receiver 200 that includes a waveform handler block 203 in communication with the demodulation and decode block 112 of the digital receiver 100 described in FIG. 1. Two additional outputs 201 and 202 are provided by the demodulator and decode block 112. The data samples 110 and the frame number 111 are input to the demodulator and decoder block 112 which converts the data samples 110 into decoded and demodulated data bits 114 together with the associated frame number 113. The decoded and demodulated data bits 114 may be in an encrypted format and if so, the de-encryption is carried out by decryption block 115. Waveform data 201, which could be in the form of data samples or symbols correspond to the input data samples 111 and the metadata 202 output includes data that is information that is associated with the waveform data 201. For example, the metadata 202 may include the frame number and may also include the encryption key, as well as an indication that encryption was enabled, as provided by input signal 205 which comes from the upper layer protocol block 117.

In this embodiment, each selection of waveform data 201 will have associated metadata 202. In a further embodiment of this disclosure, the metadata 202 may be associated with a burst that includes a block of data rather than a sample or symbol. The two outputs 201 and 202 from the demodulator decoder block 112 are input to the waveform handler 203, which captures the waveform data 201 in either the sample I/Q form or in the symbol form, and associates each set of waveform data 201 with the corresponding metadata 202. For example, a waveform record may have associated metadata in the logical sense, e.g., the data was received at 3:00 pm by User A and it was received with an SNR of 10 dB. A physical database association can then be made between the waveform record and the metadata record by the waveform handler 203. The waveform handler 203 may carry out such tasks as discarding any retries and encapsulating the waveform data 201 together with the metadata 202 associated with that waveform data 201 into, for example, an Internet Protocol (IP) data packet intended for communication over a communications network, such as, for example an IP network, i.e., the Internet. In one embodiment, a GPS receiver 206 may be connected to the waveform handler 203 so as to provide further metadata associated with the waveform data 201, such as, for example, information regarding the GPS location and the GPS time of the terminal from where a particular data burst was sent. During the analysis of the waveform data, the location of the terminal that transmitted the data burst, and the time the data burst was transmitted may be of interest. Note that indication signal 118 provides indication if encryption has been enabled for that particular data burst. This may be used for post processing of the waveform data 201. Other Layer 2 information may also be provided. Blocks 112 and 115 may be contained may be contained in a DSP or other embedded central processing units (CPUs) such as, for example, an Advanced Reduced Instruction Set (RISC) Machine (ARM) 119.

Information regarding which data bursts or data frames were the result of a retransmission request may also be used. This information may also be provided by input signal 205.

In one embodiment, the metadata 202 may include the state of the radio during burst reception. Such state information may include the profile of the Radio Processor CPU, e.g., the number of tasks running, the processor utilization and amount of memory being used, the amount of memory blocks and or cache being used and/or whether there are any exception conditions.

In one embodiment, the waveform data 201 is stored in a first storage repository 207 and the metadata 202 is stored in a second storage repository 208. In one embodiment, first storage repository 207 and second storage repository 208 are located in waveform handler 203. In another embodiment, one of first storage repository 207 and second storage repository 208 resides in waveform handler 203 while the other is located remotely. In yet another embodiment, both first data storage repository 207 and second data repository 208 are located remote from waveform handler 203. In one embodiment, first data storage repository 207, which contains the waveform data 201, may have separate, i.e., different, access rights than second data repository 207 which contains metadata 202. For example, the metadata 202 may include information regarding the GPS location and the GPS time of the terminal from where a particular data burst was sent. In this case, this information, which could be stored as channel statistics, could be considered sensitive information. In addition, the metadata 202 may include the channel type, coding rate and/or modulation rate of this particular burst as well as the encryption key and/or encryption string that would be a part of the metadata 202 for the burst signals.

Since the metadata 202 may be stored in a physically separate location from the waveform data 201 in some embodiments, it may be desirable to associate the metadata 202 to these signal datasets. This may include a reference number attached to the preamble signal dataset or watermark or other signals embedded in the waveform itself. Further, in one embodiment, it may desirable to backhaul the waveform data 201, which may be voluminous, from the wireless terminal. This data 201 may be sampled based on movement of the terminals or observed degradations in performance of the handset, for example. The backhaul operation could be performed in non-real time, for example, when network traffic levels are low, or over another network altogether. For example, the waveform and metadata records may be sent over a local Wi-Fi network.

Figure 3:
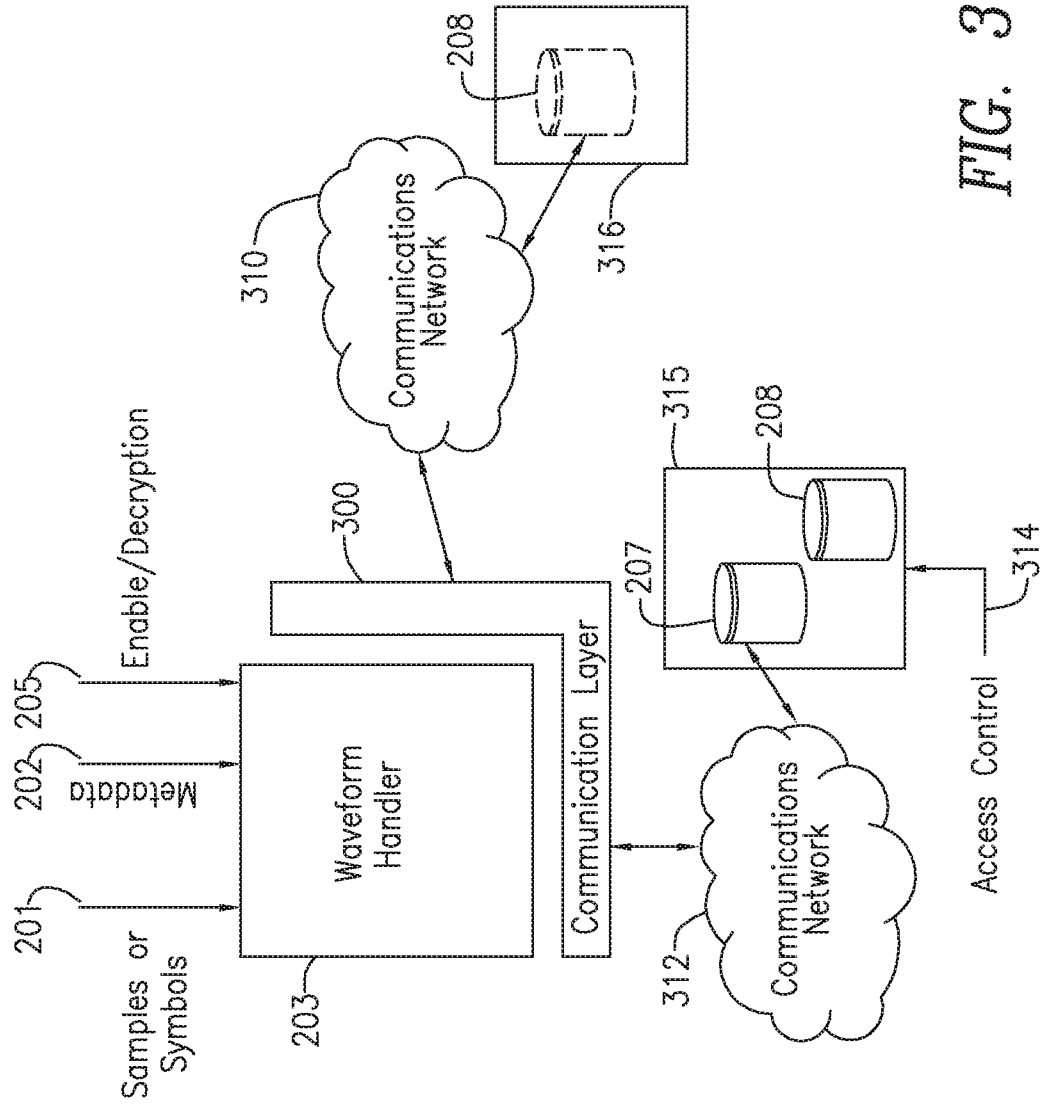
FIG. 3 is a block diagram including the addition of the waveform handler module interfacing with storage components over an Internet Protocol (IP) network utilizing the principles of the present disclosure.

FIG. 3 is a block diagram of an embodiment of the present disclosure that shows the addition of a communication layer 300 to the waveform handler 203. The communication layer 300 may create an IP data packet from data produced by the waveform handler 203 (and containing both the waveform data 201 and associated metadata 202 and communicate the encapsulated packet via a communications network 312 to data storage 315. Data storage 315 may include data repositories 207 and 208. In one embodiment, waveform data 201 from the encapsulated data packet is stored in data repository 207 and associated metadata 202 is stored in data repository 208. Thus, data repositories 207 and 208 may reside in the same storage location 315 but waveform data 201 and metadata 202 are each maintained in a separate data repository. In another embodiment, one of data repository 207 or 208, for example, database 208, may be maintained in a remote storage location 316 and the IP data packet transmitted to the remote storage location 316 via a separate communications network 310. The IP data packet may be communicated over, for example, a wired Ethernet connection or via a wireless local area network (WLAN), or over any wireless or wired medium. Once stored, the waveform data 201 stored in data repository 207 in data storage 315 can be accessed via, for example, an access control signal 314, ether locally or remotely.

Hence, the waveform data 201 is originally detected by the digital wireless receiver 200 as shown in FIG. 2 and then is input to the waveform handler 203, shown in FIG. 2, along with metadata 202 that is associated with the waveform data 201. In one embodiment, the waveform data 201 together with its associated metadata 202, are encapsulated into IP data format by the waveform handler 203, in FIG. 2 and FIG. 3, and communicated via the communication layer 300 in FIG. 3 to data storage 315 which contains local storage repositories 207 and/or 208. The metadata 202 may be stored at a separate location from the waveform data 201, for example, storage repository 207 may be used to store the waveform data 201 and storage repository 208 may be used for the metadata 202. The storage repositories may also be local to the receiver 200 and, in one embodiment, the encapsulation may not necessarily be in the form of an IP datagram but may be in a form where the metadata 202 and the sample or waveform data 201 can be associated together. For example, a reference to the metadata 202 may be appended as a header to the data symbol or sample waveform data 201. This header may have address information that can be used to access the associated metadata signal at a later time. In another embodiment, to associate the captured data burst, a number of samples of the burst may be selected and used to represent a "fingerprint" of the signal. This fingerprint may be assessed using, for example, a hash table to find the stored burst metadata. In another embodiment, a watermark signal may be added to the burst before the signal is saved.

Figure 4:
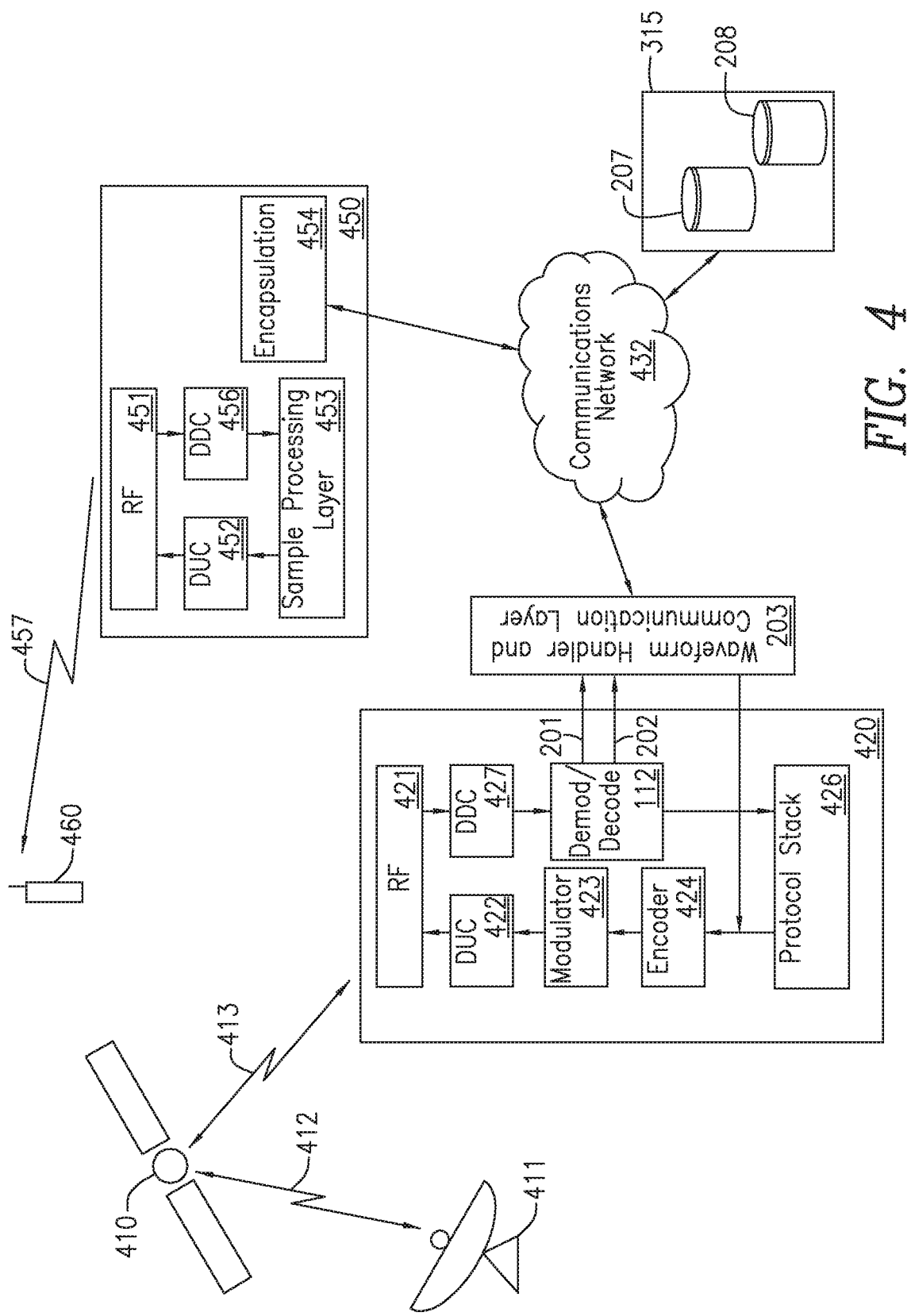
FIG. 4 is a block diagram of an embodiment of the present disclosure used in a satellite based radio access network.

FIG. 4 is a diagram of another embodiment of this disclosure which depicts a satellite based radio access network that includes a satellite 410, a ground station 411, a wireless transmitter receiver 420, a wireless repeater 450 and a hand held wireless device 460. On the receive side of transmitter receiver 420, the received data waveforms 413 are processed by the RF block 421 and down converted by DDC 427. The components of transmitter receiver 420 may be similar to digital wireless receiver 200 described with respect to FIG. 2. The waveforms are then demodulated and decoded by demodulator decoder block 112. From the demodulator and decoder block 112, the waveform data 201 is input to the waveform handler 203 together with the metadata 202 associated with the waveform data 201. The waveform handler 203 may include the communications layer 300 shown in FIG. 3. The encapsulated data packets that include both the waveform data 201 and the associated metadata 202 produced by the waveform handler 203 may be stored in data storage 315 via a communications network 432. Data storage 315 may include data repositories 207 and 208 as described in FIG. 3. In one embodiment, waveform data 201 from the encapsulated data packet is stored in data repository 207 and associated metadata 202 is stored in data repository 208. Thus, data repositories 207 and 208 may reside in the same storage location 315 but waveform data 201 and metadata 202 are each maintained in a separate data repository. In another embodiment, either of data repository 207 or 208 may be maintained in a remote storage location.

In another embodiment, the encapsulated data packets may be transmitted over a wireless communications network 432 to the repeater 450 where encapsulated data packets are received by the encapsulation block 454. Hence, the data may be transmitted to another location for analysis directly via a sample processing layer 453, a digital up converter (DUC) 452 and RF block 451, or may be replayed later and transmitted through the same process. The repeater 450 may be used to extend the coverage of the satellite 410. This is shown in FIG. 4 by the repeater 450 relaying the original transmission 413 to the wireless device 460 via transmission signal 457. The wireless device 460 may also use the repeater 450 to communicate with the satellite 410 via transmitter receiver 420 by the reverse process to that just described. In this instance, the transmission from the wireless device 460 is received by the RF block 451, down converted by the digital down converter (DDC) 456, processed and encapsulated by the sample processing layer 453 and the encapsulation layer 454, communicated via communication network 432 to the transmitter receiver 420 via the waveform handler 203 and, in some embodiments, communications layer 300 as shown in FIG. 3, and then transmitted to satellite 410 through a transmission chain that includes protocol stack 426, the encoder 424, modulator 423, up converter 422 and the RF block 421.

Figure 5:
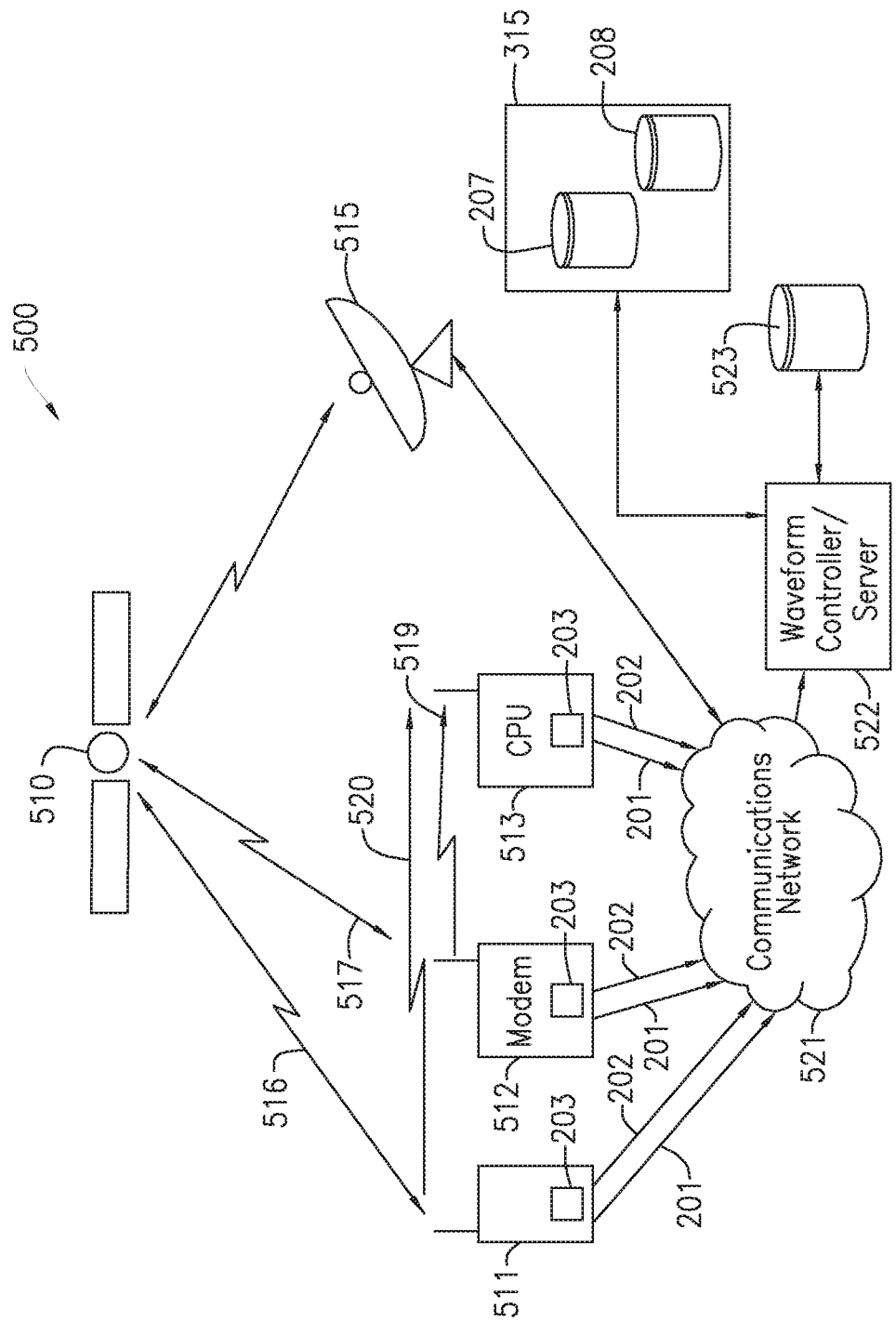
FIG. 5 is a block diagram of an exemplary radio network, with several terminal types, where the waveform data is saved in storage along with metadata though the IP network.

FIG. 5 is a block diagram of a network 500 that demonstrates example uses of embodiments of the disclosure. The network 500 includes a communications satellite 510 which is configured to receive signals from and send signals to a ground station 515. Other devices that may be in communication with satellite 510 are a wireless device 511, and a modem 512 while a monitor station 513 is used to listen to the communications of the wireless device 511 and the modem 512. Each or any of the devices, 511, 512 and 513 may include waveform handler 203 shown in FIG. 4 and described herein, as well as communications layer 300 shown in FIG. 3, embodied into their architectures. Further, the receiver at the ground station 515 may also include waveform handler 203 and communications layer 300. The wireless device 511 may send its encapsulated waveforms 201 and metadata 202, as shown in FIG. 4, via communications network 521, such as, for example, the Internet, to a waveform controller/server 522. In the case of the wireless device 511, the communications link to communications network 521 may use a WLAN connection, for example a WLAN connection conforming to IEEE 802.11 (commonly known as Wi-Fi). Similarly, the modem 512, the monitor 513 and the ground station 515 may send their encapsulated waveforms 201 and metadata 202, via communications network 521, to the waveform controller/server 522, using, for example, either Ethernet or Wi-Fi.

The encapsulated data that is sent to the waveform controller/server 522 is processed by the waveform controller/server 522 and then stored in the storage facility 523. Thus, in one embodiment, the encapsulated data from waveform controller/server 522 is stored in a single storage facility 523. In one embodiment, though stored in a single storage facility 523, the waveforms 201 and the metadata 202 each have different access rights. In another embodiment, encapsulated data is stored in data storage 315 where the waveforms 201 and metadata 202 are stored in separate storage repositories, 207 and 208 respectively. In one embodiment, waveforms 201 in data repository 207 have one level of access rights and metadata 202 in data repository 208 have a different level of access rights. The stored data may be used to gather samples of the communications in the network 500 for either real time analysis or for later analysis, or for both. For example, random timeslots of data may be examined so as to assess the quality of the service. This may be carried out, for example, if a problem with the service was reported and in this case the historical data may be examined. Also, in the case that the data is encrypted, the data may be gathered in its waveform state and then used for future post-decryption. The gathering operation of this disclosure may be performed by the devices themselves, as previously explained, or a central storage facility may be used as represented by storage facility 523 in conjunction with waveform controller/server 522. In the case that the wireless device 511 and/or the modem 512 do not have the waveform handler 203 and communications layer 300 embodied therein, communication signals 516 between wireless device 511 and satellite 510 and communication signals 517 between modem 512 and satellite 510 may be detected by a CPU 513, as shown by the communication signals 519 and 520. CPU 513, or a set of CPUs may therefore be used to detect the communications mentioned above and store and/or display any selected waveform data 201 and metadata 202 in the network 500. The waveform controller/server 522 may also be used to store the waveform data 201 and also to replay it.

FIG. 5 is a block diagram of a network 500 that demonstrates example uses of embodiments of the disclosure. The network 500 includes a communications satellite 510 which is configured to receive signals from and send signals to a ground station 515. Other devices that may be in communication with satellite 510 are a wireless device 511, and a modem 512 while a monitor station 513 is used to listen to the communications of the wireless device 511 and the modem 512. Each or any of the devices, 511, 512 and 513 may include waveform handler 203 shown in FIG. 4 and described herein, as well as communications layer 300 shown in FIG. 3, embodied into their architectures. Further, the receiver at the ground station 515 may also include waveform handler 203 and communications layer 300. The wireless device 511 may send its encapsulated waveforms 201 and metadata 202, as shown in FIG. 4, via communications network 521, such as, for example, the Internet, to a waveform controller/server 522. In the case of the wireless device 511, the communications link to communications network 521 may use a WLAN connection, for example a WLAN connection conforming to IEEE 802.11 (commonly known as Wi-Fi). Similarly, the modem 512, the monitor 513 and the ground station 515 may send their encapsulated waveforms 201 and metadata 202, via communications network 521, to the waveform controller/server 522, using, for example, either Ethernet or Wi-Fi.

The encapsulated data that is sent to the waveform controller/server 522 is processed by the waveform controller/server 522 and then stored in the storage facility 523 or data storage 315, as discussed above. The stored data may be used to gather samples of the communications in the network 500 for either real time analysis or for later analysis, or for both. For example, random timeslots of data may be examined so as to assess the quality of the service. This may be carried out, for example, if a problem with the service was reported and in this case the historical data may be examined. Also, in the case that the data is encrypted, the data may be gathered in its waveform state and then used for future post-decryption. The gathering operation of this disclosure may be performed by the devices themselves, as previously explained, or a central storage facility may be used as represented by storage facility 523 in conjunction with waveform controller/server 522. In the case that the wireless device 511 and/or the modem 512 do not have the waveform handler 203 and communications layer 300 embodied therein, communication signals 516 between wireless device 511 and satellite 510 and communication signals 517 between modem 512 and satellite 510 may be detected by a CPU 513, as shown by the communication signals 519 and 520. CPU 513, or a set of CPUs may therefore be used to detect the communications mentioned above and store and/or display any selected waveform data 201 and metadata 202 in the network 500. The waveform controller/server 522 may also be used to store the waveform data 201 and also to replay it for the purposes of investigating the quality of the communications or for post decryption of the data.

Figure 6:
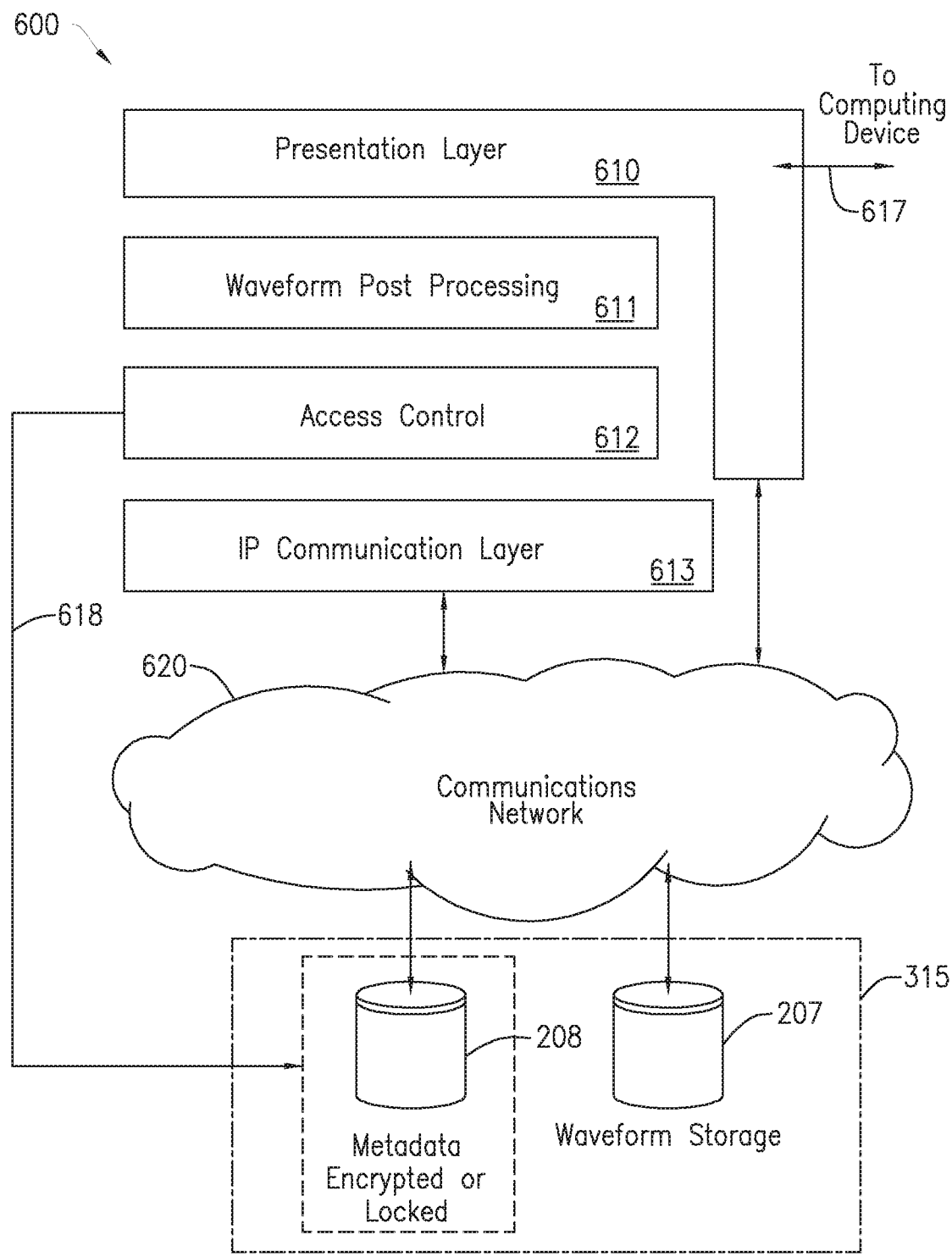
FIG. 6 is a diagram depicting the waveform storage and playback embodiments of the present disclosure.

FIG. 6 is a diagram that represents an exemplary embodiment of the present disclosure that may be used to store and playback the encapsulated waveform data 201 and metadata 202 as carried out by the waveform handler 203 in FIG. 2 and FIG. 3, or store and playback the encapsulated waveform data 201 and metadata 202 as carried out by the waveform controller/server 522 in FIG. 5. A presentation layer 610 may communicate via interface 617, with a computing device such as a personal computer, which may run a web interface or an application that interfaces to a user. The details of the program that runs on the user's computer do not form part of this disclosure. This disclosure includes methods and arrangements that store waveform data 201 and metadata 202, in a pure or condensed form, in separate databases, each of which can be examined for quality of service purposes or for post decryption purposes. A waveform post processing layer 611 may be used to process the incoming encapsulated data packets or the stored packets so as to be suitable for storage or communication respectively. For example, the incoming waveform data 201 may be compressed either in the waveform handler 203 in the device or in the waveform processing layer 611 prior to storage. Similarly, the waveform post processor layer 611 may expand the compressed stored waveform 201 data prior to examination or post decryption. In one embodiment, an access control layer 612 may be used to allow only trusted authorities to gain access to the metadata 202 via interface 618. In one embodiment, presentation layer 610, waveform post processing layer 611 and access control layer 612 are all part of the waveform handler 203 in FIG. 2 and FIG. 3 or the waveform controller/server 522 of FIG. 5. In this embodiment, storage 315 may be local but in the case that the storage 315 is remote, the IP communication layer 613 is used to enable connectivity with the storage 315. The storage 315 stores the metadata 202 and waveform data 201 in one or more storage files.

In FIG. 6, two file storages are shown, metadata storage file 208 and waveform storage file 207. In one embodiment, metadata 202 is stored in metadata file storage 208 and may be encrypted or locked so as to prevent unauthorized access controlled by the access control layer 612. The waveform storage file 207 may be physically in the same location as the metadata storage file 208 or may be separately located. To replay the stored data, the storage 315 may be accessed through the presentation layer 610. If the storage 630 is remote then the presentation layer 610 accesses the data through communications network 620.

Figure 7:
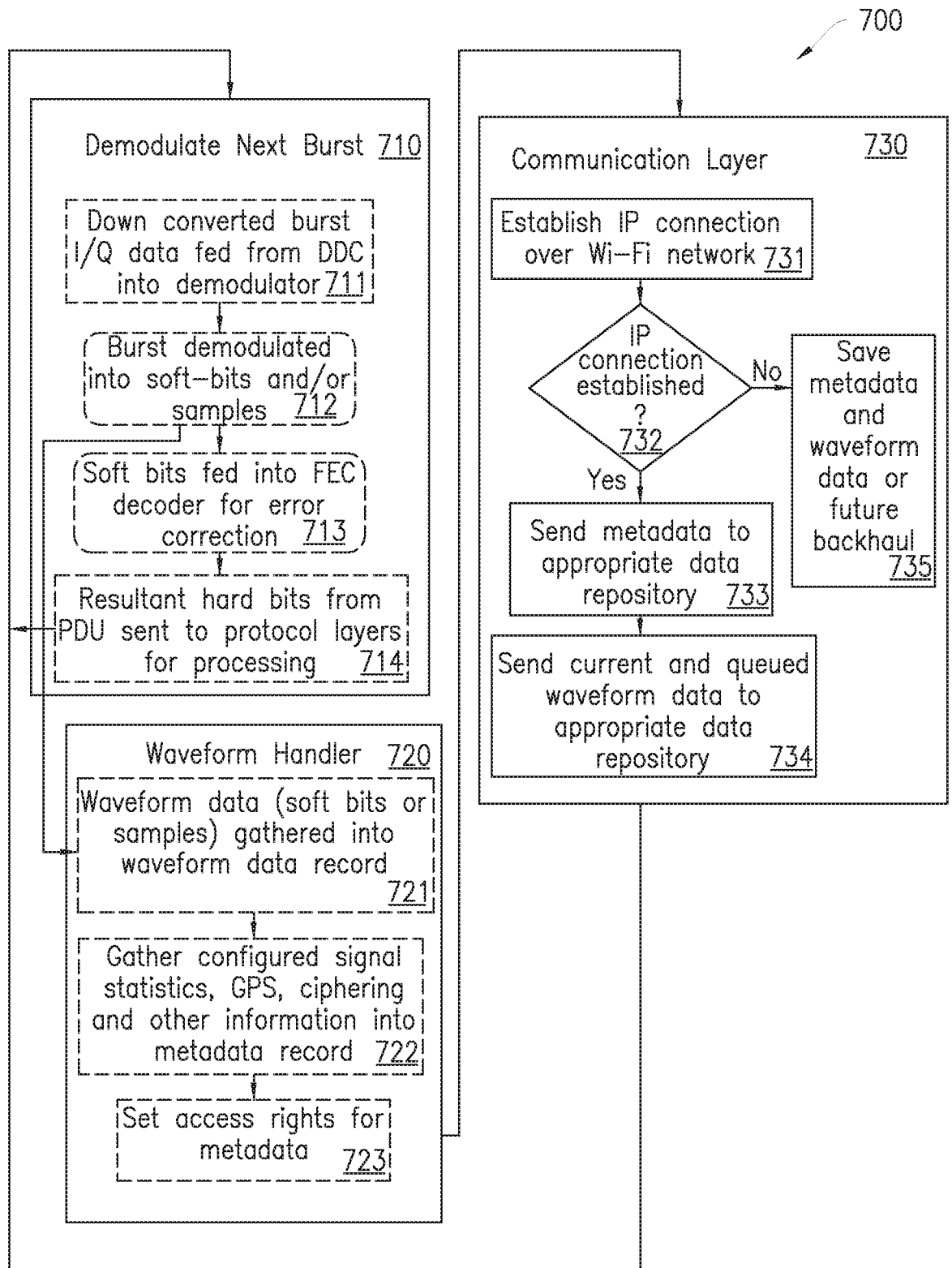
FIG. 7 is a flow diagram of an embodiment of the disclosure that corresponds to the block diagrams as described in FIG. 1, FIG. 2 and FIG. 3.

FIG. 7 is a flow chart 700 depicting an embodiment of the disclosure that corresponds to the descriptions provided in FIG. 2 and FIG. 3. In block 710, the next received burst signal is demodulated by decode block 112 and the waveform data 201 determined. Block 710 may include block 711. In block 711, the received burst signal is down converted, by, for example, a digital down converter, to I/Q data bits. Block 711 may be followed by block 712 where the down converted data is demodulated into waveform data 201 by decode block 112 in the form of soft bits or samples. Block 712 may be followed by block 713 where the data is fed into a forward error correction decoder where errors in the received data may be corrected. Block 713 may be followed by block 714 where the resultant hard bits are sent to the upper level protocol layer layers 117 for processing. The flow then returns to block 710 to await the next signal burst. The soft bits or samples produced in block 712 may be input to block 720, which includes exemplary steps performed by the waveform handler 203 in FIG. 2 and FIG. 3. Block 720 may include block 721 where the soft bits or waveform data 201 from block 712 are gathered into a waveform data record and stored, for example, in data repository 207. Block 721 may be followed by block 722 where the metadata 202 associated with the waveform samples or soft bits stored in block 721 are gathered together into a metadata record and is stored, for example, in data repository 208. Examples of metadata 202 that form the metadata record may be, for example, signal statistics, GPS information, ciphering and other information. In one embodiment the access rights for this metadata 202 may then be set in block 723. In one embodiment, the access rights for accessing metadata 202 are separate from the access rights for accessing waveform data 201. At the conclusion of block 720, records of the waveform 201 and the associated metadata 202 are present.

Block 730 depicts exemplary steps performed by the communications layer 300 in FIG. 3. Block 730 may include block 731 where a communications session, such as an IP connection to communications network 312, is established. This connection may be over a Wi-Fi network for example, although any communications network may be utilized. Block 730 may include block 732 which checks that the communication connection has been established. If the connection has been established, the metadata 202 recorded in block 722 in the form of a metadata record may be sent to the appropriate repository, in block 733, for example data repository 208, in FIG. 2 and FIG. 3. Similarly, if the communication connection has been established in block 732 the waveform data recorded in block 721 may be sent to the appropriate data repository, for example data repository 207, in FIG. 2 and FIG. 3. If the communication connection is not established in block 732, then the metadata record and waveform record stored in blocks 722 and 721 respectively, may be saved for future backhaul, in block 735. At the point, the records are either sent to their appropriate repositories or saved for future backhaul, and the process returns to block 710 to await the next received burst.

Figure 8:
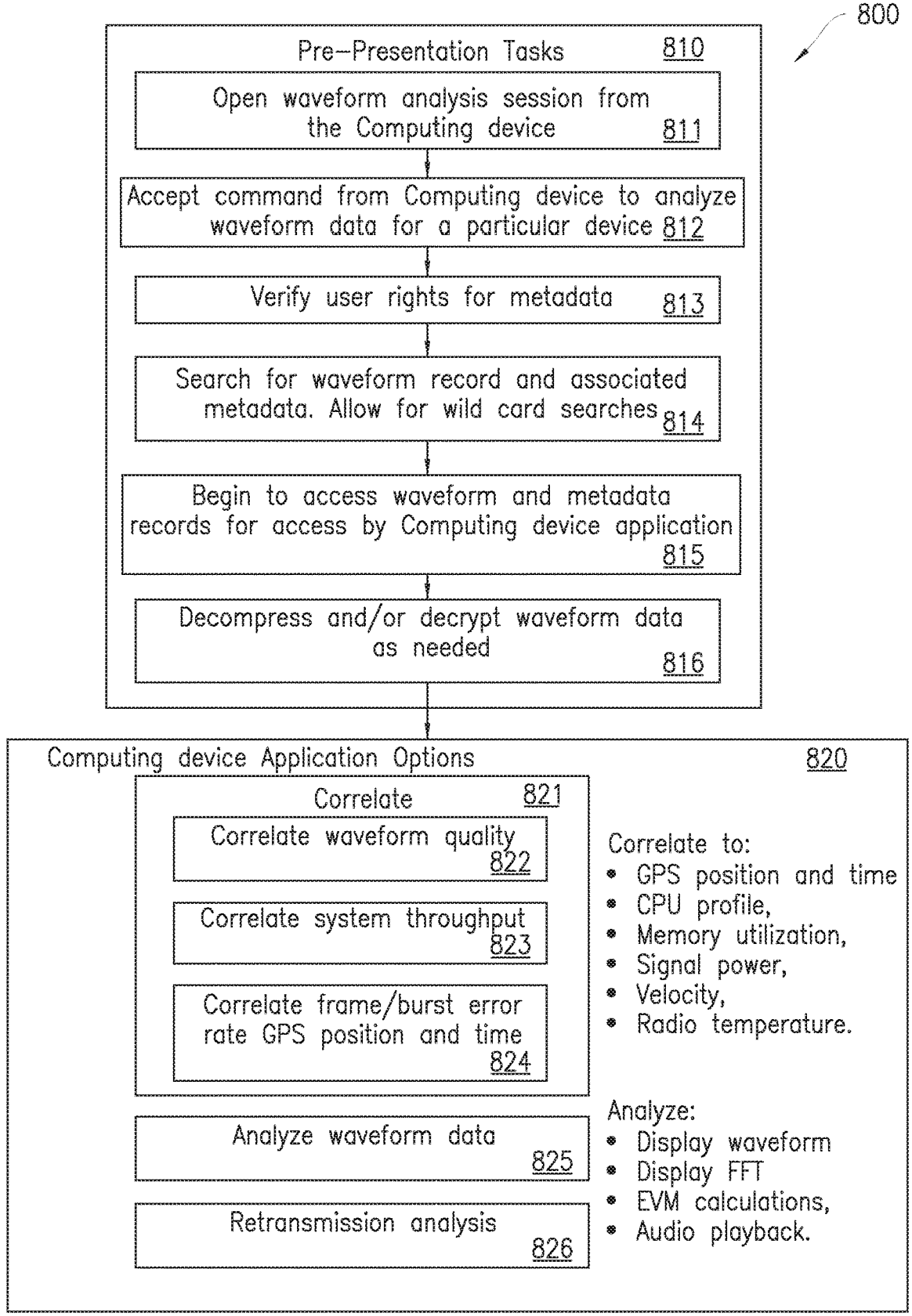
FIG. 8 is a flow diagram of an embodiment of the present disclosure that corresponds to the waveform storage and playback embodiment of FIG. 6.

FIG. 8 is a flow diagram 800 that depicts, in one embodiment, an exemplary process that may be performed by the presentation layer 610 in FIG. 6 together with interface 617. The flow 800 may start with block 810 where pre-presentation tasks are performed. Block 810 may include block 811, where a waveform analysis session is opened and the data prepared for presentation. Block 810 may include block 812 where a command from a computing device, for example via interface 617, is received and accepted. The command may include a request to initiate the analysis of the waveform data for a particular device. Block 812 may be followed by block 813 where the user's rights to the metadata 202 are verified. This may take the form of a password or certificate. Block 813 may be followed by block 814 which a search or searches for the waveform record and the associated metadata record is performed. Wild card searches may also be performed. In block 815, the waveform and metadata records are accessed, such that they can be accessed by an application running on the requesting computer. Block 815 may be followed by block 816 which decompresses and/or decrypts the waveform data as required.

Process 800 may include block 820 where a selection of computer application options may be selected. Block 820 may include a selection of blocks that perform steps to correlate one or more metrics. For example, waveform quality may be correlated at block 822, the system throughput may be correlated at block 823 and the frame/burst error rate may be correlated at block 824. In each case, each of these metrics may be correlated to one or more measurements such as, for example, the GPS position and time, CPU profile, memory utilization, signal power, velocity, and/or radio temperature. Block 820 may also include block 825 where the waveform data may be displayed or played back for post analysis. Analysis could be any type of data analysis including but not limited to displaying the waveform data, performing a fast Fourier transform (FFT) analysis and displaying the results, performing an error vector magnitude (EVM) calculation and/or audio playback of the waveform data. Block 820 may also include block 826 where retransmission analysis may be performed. Once the waveform data 201 together with the metadata 202 has been stored, a variety of post analysis options are available.

This disclosure describes additions to a radio or receiver to add the capability to store the modulated waveform data 201 or the demodulated waveform together with metadata 202 either locally or at a remote site. This stored information may be encapsulated for transmission over a communication network such as the Internet. This stored information may be used for future playback for quality purposes. Metadata 202 associated with the waveform data 201 may also be stored, and in one embodiment, is stored in a separate location with separate access rights. This disclosure enables the ability to examine conditions when an outage or poor performance of the communication system was reported. By storing the waveform data 201 and the associated metadata 202, the information contained in the waveforms is in its raw state and hence still in an encrypted form. The information contained may be decrypted at a future point in time. Methods, such as A-Law and u-Law, to compress waveforms are well known and hence the amount of saved data can be readily reduced by storing the demodulated soft bits in place of the radio burst data. When playing back the stored information, for the purposes of relay, or, for example, transferring the information to a particular location, the base waveforms may be up converted to a different carrier frequency than the original.

Figure 9:
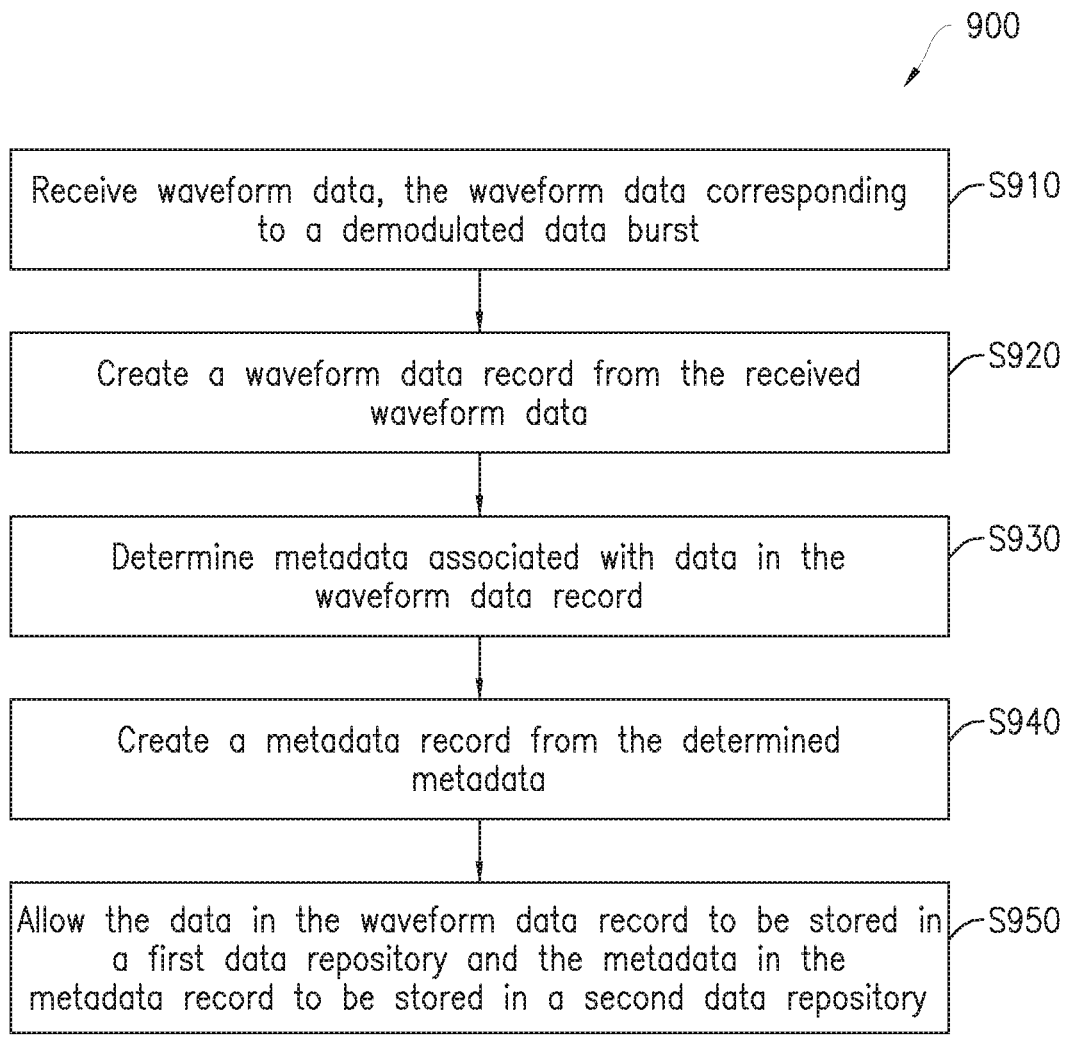
FIG. 9 is a flow diagram illustrating an exemplary process performed by waveform handling apparatus the present disclosure.

FIG. 9 is a flow diagram illustrating an exemplary process 900 for associating waveform data 201 with corresponding metadata 202 performed by waveform handler 203 in accordance with the principles of the present disclosure. The process includes receiving waveform data 201 and metadata 202, the waveform data corresponding to a demodulated data burst (step S910), creating a waveform data record from the received waveform data 201 (step S920), associating the waveform data 201 with corresponding metadata 202 (step S930), creating a metadata record from the corresponding metadata 202 (step S940), and causing the waveform data 201 in the waveform data record to be stored in a first data repository 207 and the corresponding metadata 202 in the metadata record to be stored in a second data repository 208, where the waveform data 201 and the corresponding metadata 202 are accessible for analysis (step S950). In one embodiment, the waveform data and the metadata are encapsulated in an Internet Protocol data packet; and the IP packet transmitted over the communications network. In another embodiment, the method further includes determining access rights for the waveform data 201 and determining access rights for the metadata 202, where the access rights for the waveform data are separate from the access rights for the metadata. In another embodiment, the metadata 202 may include at least one of channel type, coding rate, modulation rate, encryption key and encryption string of the data burst. In another embodiment, the method includes receiving GPS data from a GPS receiver, updating the waveform data record to include the GPS data, creating additional metadata based on the received GPS data, and updating the metadata record to include the additional metadata.

In another embodiment, the method further includes receiving additional metadata, aggregating the additional metadata with the received metadata to provide an aggregate metadata record, and analyzing the aggregate metadata record independent of the received waveform data. Thus, various metadata from different devices may be gathered together and aggregated for post processing independent of signal data. For example, the GPS position and time metadata could be gathered with the received signal strength indicator (RSSI) or quality. Then these data sets are aggregated from all the wireless devices used in the network to determine if there is a correlation to position/time and/or quality. Thus, it may be seen that at a certain time, or location, signal quality is degraded.

Figure 10:
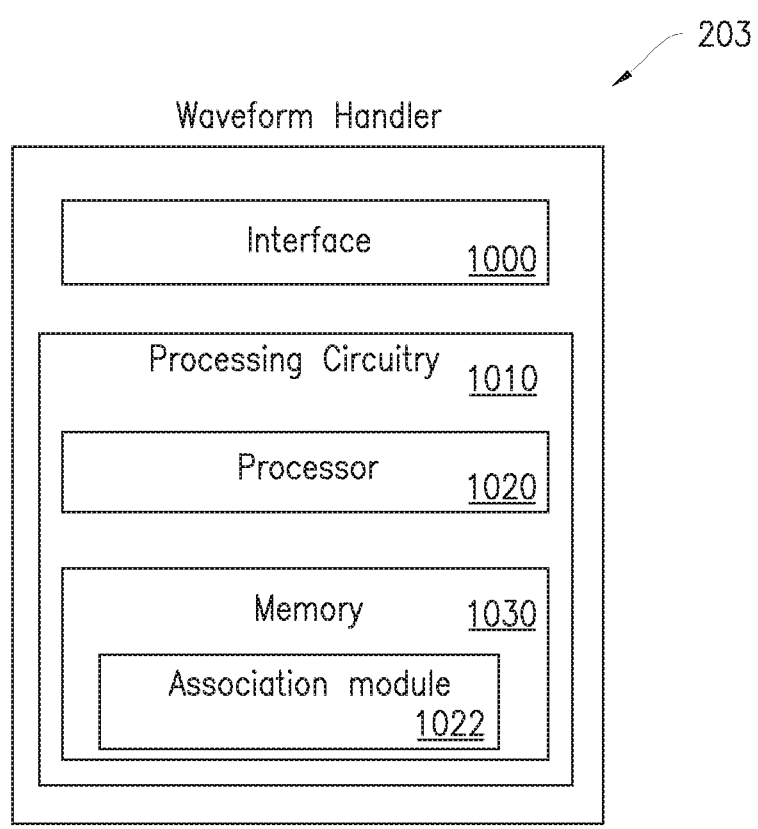
FIG. 10 illustrates an exemplary embodiment of a waveform handling apparatus that may be used to capture data waveforms and determine associated metadata incorporating the principles of the present disclosure.

FIG. 10 depicts an exemplary waveform handling apparatus 203 configured to perform the methods described herein. Waveform handling apparatus 203 is configured to receive waveform data 201 and metadata 202 and associate the waveform data 201 with corresponding metadata 202 as described herein. Waveform handling apparatus 203 may include an interface 1000 configured to receive waveform data 201 and metadata 202, the waveform data 201 corresponding to a demodulated data burst. Waveform handling apparatus 203 may also include processing circuitry 1010. Processing circuitry 1010 may include a processor 1020, and a memory 1030. In addition to a traditional processor and memory, processing circuitry 1010 may comprise integrated circuitry for processing and/or control, e.g., one or more processors and/or processor cores and/or FPGAs (Field Programmable Gate Array) and/or ASICs (Application Specific Integrated Circuitry). Processing circuitry 1010 may comprise and/or be connected to and/or be configured for accessing (e.g., writing to and/or reading from) memory 1030, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1030 may be configured to store code executable by control circuitry and/or other data, e.g., data pertaining to communication, e.g., configuration and/or address data of nodes, etc. Processing circuitry 1010 may be configured to control any of the methods described herein and/or to cause such methods to be performed.

Memory 1030 stores instructions that, when executed, configure the processor 1020 to create a waveform data record from the received waveform data 201. Via association module 1022, processor 1020 is further configured to associate the waveform data 201 with corresponding metadata 202, create a metadata record from the corresponding metadata 202, and allow the waveform data 201 in the waveform data record to be stored in a first data repository 207 and the corresponding metadata 202 in the metadata record to be stored in a second data repository 208, the waveform data 201 and the corresponding metadata 202 accessible for analysis.

Although the above description uses a TDMA satellite system as an example, in no way should use of this system be construed as limiting the present disclosure to solely a TDMA satellite system. The methods and arrangements of the present disclosure can be applied to any wireless communication system where time division multiplexing (TDM) and bursts are used.

The arrangements and methods disclosed herein solve the problems not addressed by the prior art. Specifically, the arrangements and methods disclosed herein allow for incoming data bursts to be demodulated and a data waveform created. Metadata is associated with the data waveform and records of each are created and stored in separate data repositories. Thus, the records in each repository can be provided with separate, i.e., different, access rights. This allows for providing a higher level of security for metadata that may, for example, contain sensitive information, while allowing the data waveform to have a lower level of access rights, thus allowing the data waveform to be analyzed separately.

While the above description contains many specifics, these should not be construed as limitations on the scope, but rather as an exemplification of several embodiments thereof. It is of course not possible to describe every conceivable combination of components and methodologies for the purposes of describing this disclosure and one of ordinary skill in the art may recognize that many further combinations and permutations of the various embodiments are possible, including, for examples: the details of the receiver blocks, the waveform handler, the communications layer, the metadata, the waveform compression, the storage methods. Accordingly, the scope should be determined not solely by the embodiments illustrated.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a specific purpose computer for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Accordingly the scope should be determined not by the embodiments illustrated, but by the claims and their legal equivalents.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for determining signal quality degradation for a plurality of digital radios, the method comprising:
receiving Global Positioning System (GPS) data from a GPS receiver;
receiving waveform data and metadata at a central server from the plurality of digital radios, the waveform data corresponding to a waveform, the metadata corresponding to the waveform data, the metadata including an encryption key, an indication that encryption of the waveform data is enabled, time, date and location information specifying a time and date of transmission of the waveform data and a location of each of the plurality of digital radios;
retrieving the encryption key;
using the encryption key to decrypt the waveform data;
creating additional metadata based on the received GPS data;
aggregating the additional metadata with the metadata to determine aggregate metadata;
analyzing the waveform data and associated metadata to determine a signal quality of the corresponding waveform from each of the plurality of digital radios;
correlating the signal quality of the waveforms with the corresponding metadata, correlating the signal quality including analyzing the aggregate metadata independent of the received waveform data to determine a signal quality associated with the aggregate metadata; and
determining signal quality degradation for the plurality of digital radios based on the correlation of the signal quality of the waveforms with the corresponding metadata.

2. The method of claim 1, wherein the waveform data comprises at least one of a sampled waveform and soft-bits of a demodulated waveform.

3. The method of claim 1, wherein the signal quality is based at least in part on at least one of adjacent channel interferences, burst alignment problems, conditions associated with hardware problems, and system temperature.

4. The method of claim 1, wherein the received GPS data includes GPS position and GPS time, and the signal quality includes signal strength indicator (RSSI).

5. The method of claim 1, further comprising correlating the signal quality of the waveforms with at least one of GPS position, GPS date, GPS time, Central Processing Unit (CPU) profile, memory utilization, signal power, velocity, and radio temperature to determine signal quality degradation for the plurality of digital radios.

6. The method of claim 1, wherein analyzing the waveform data and associated metadata further includes at least one of:
displaying the waveform data;
performing a fast Fourier transform (FFT) analysis on the waveform data and displaying results of the performed FTT analysis;
performing an error vector magnitude (EVM) calculation based at least on the waveform data;
audio playback of the waveform data; and
retransmission analysis.

7. The method of claim 1, the method further comprising backhauling the waveform data from at least one of the digital radios from the plurality of digital radios to the central server.

8. The method of claim 1, wherein the metadata include at least one of:
a channel type;
a coding rate;
a modulation rate;
an encryption key; and
an encryption string.

9. A waveform handler apparatus, the waveform handler apparatus comprising:
an interface configured to:
receive Global Positioning System (GPS) data from a GPS receiver; and
receive waveform data and metadata at a central server from the plurality of digital radios, the waveform data corresponding to a waveform, the metadata corresponding to the waveform data, the metadata including an encryption key, an indication that encryption of the waveform data is enabled, time, date and location information specifying a time and date of transmission of the waveform data and a location of each of the plurality of digital radios; and
processing circuitry in communication with the interface, the interface comprising:
a processor; and
a memory storing instructions that, when executed, configure the processor to:
retrieve the encryption key;
use the encryption key to decrypt the waveform data;
create additional metadata based on the received GPS data;
aggregate the additional metadata with the metadata to determine aggregate metadata;
analyze the waveform data and associated metadata to determine a signal quality of the corresponding waveform from each of the plurality of digital radios;
correlate the signal quality of the waveforms with the corresponding metadata, correlating the signal quality including analyzing the aggregate metadata independent of the received waveform data to determine a signal quality associated with the aggregate metadata; and
determine signal quality degradation for the plurality of digital radios based on the correlation of the signal quality of the waveforms with the corresponding metadata.

10. The waveform handler apparatus of claim 9, wherein the waveform data comprises at least one of a sampled waveform and soft-bits of a demodulated waveform.

11. The waveform handler apparatus of claim 9, wherein the signal quality is based at least in part on at least one of adjacent channel interferences, burst alignment problems, conditions associated with hardware problems, and system temperature.

12. The waveform handler apparatus of claim 9, wherein the received GPS data includes GPS position and GPS time, and the signal quality includes signal strength indicator (RSSI).

13. The waveform handler apparatus of claim 9, wherein the memory further stores instructions that, when executed, configure the processor to correlate the signal quality of the waveforms with at least one of GPS position, GPS date, GPS time, Central Processing Unit (CPU) profile, memory utilization, signal power, velocity, and radio temperature to determine signal quality degradation for the plurality of digital radios.

14. The waveform handler apparatus of claim 9, wherein the memory further stores instructions that, when executed, configure the processor to further analyze the waveform data and associated metadata including at least one of:
    displaying the waveform data;
    performing a fast Fourier transform (FFT) analysis on the waveform data and displaying results of the performed FTT analysis;
    performing an error vector magnitude (EVM) calculation based on at least the waveform data;
    audio playback of the waveform data; and
    retransmission analysis.

15. The waveform handler apparatus of claim 9, wherein the metadata include at least one of:
    a channel type;
    a coding rate;
    a modulation rate;
    an encryption key; and
    an encryption string.

16. A waveform handler apparatus, the waveform handler apparatus comprising:
    an interface configured to:
      receive Global Positioning System (GPS) data from a GPS receiver; and
      receive waveform data and metadata at a central server from the plurality of digital radios, the waveform data corresponding to a waveform, the waveform data including at least one of a sampled waveform and soft-bits of a demodulated waveform, the metadata corresponding to the waveform data, the metadata including an encryption key, an indication that encryption of the waveform data is enabled, GPS time, GPS date and GPS location information specifying a time and date of transmission of the waveform data and a location of each of the plurality of digital radios; and
    processing circuitry in communication with the interface, the interface comprising:
      a processor; and
      a memory storing instructions that, when executed, configure the processor to:
        retrieve the encryption key;
        use the encryption key to decrypt the waveform data;
        create additional metadata based on the received GPS data;
        aggregate the additional metadata with the metadata to determine aggregate metadata;
        analyze the waveform data and associated metadata to determine a signal quality of the corresponding waveform from each of the plurality of digital radios, the signal quality being based at least in part on at least one of adjacent channel interferences, burst alignment problems, conditions associated with hardware problems, and system temperature;
        correlate the signal quality of the waveforms with the corresponding metadata, correlating the signal quality including analyzing the aggregate metadata independent of the received waveform data to determine a signal quality associated with the aggregate metadata; and
    determine signal quality degradation for the plurality of digital radios based on the correlation of the signal quality of the waveforms with the corresponding metadata.

* * * * *